INVENTORS.
ROBERT DENES
PAUL POSEGA
JOHN C. HAYTER
BY Joseph W. Malleck
ATTY.

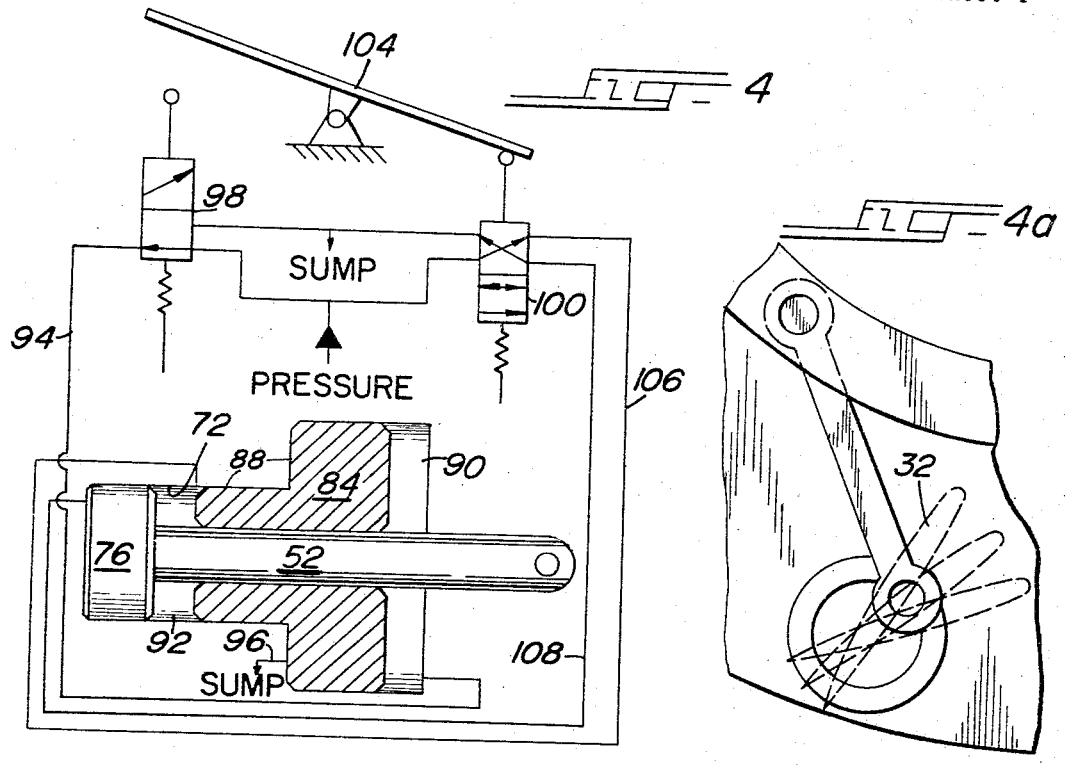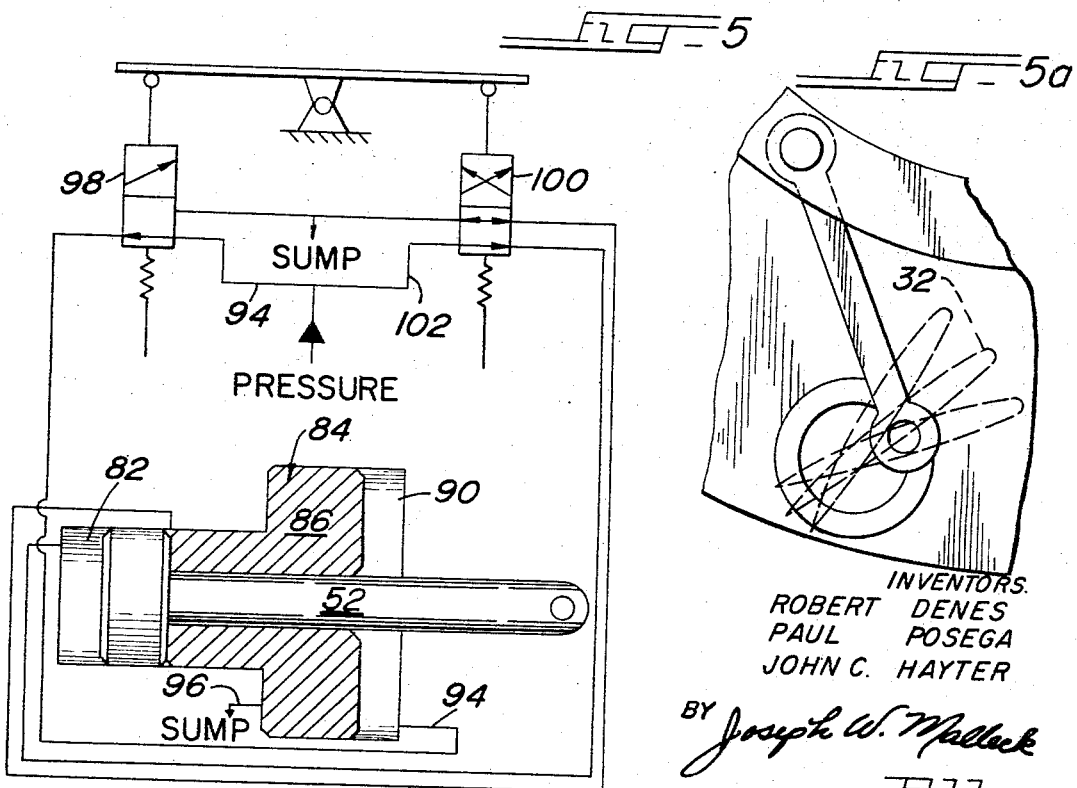

3,330,112
VARIABLE PITCH HYDROKINETIC DRIVE
Robert Denes and Paul Posega, Rockford, and John C. Hayter, Rockton, Ill., assignors to Borg-Warner Corporation, Chicago, Ill., a corporation of Illinois
Filed Dec. 30, 1965, Ser. No. 517,631
10 Claims. (Cl. 60—54)

ABSTRACT OF THE DISCLOSURE

A transmission employing a variable capacity torque converter of the three-element uni-directional type with the stator element disposed in the axial flow and the impeller turbine disposed in the radial flow; the impeller blading is variable in pitch by way of a manually hydraulic control which is effective to index a control piston operating a worm gear for movement of a plurality of splined sectors interconnected with the variable blading.

---

This invention relates to power transmissions and more particularly to a variable capacity torque converter for an automotive vehicle in which a prime mover is utilized to supply power for propulsion and other functions.

This invention is particularly directed to a transmission for a vehicle of the off-the-road type such as a front loading shovel. In this type of vehicle it is desirable, during normal operations, to have a reasonable torque level available to the driveline, and a reasonable level of torque available to the power shovel operating mechanism. At times it is desirable to have a majority of torque available for the driveline, and at other times it is desirable to have a majority of torque available to the power takeoff.

Accordingly, it is a principal object of the invention to provide a power transmission comprising a torque converter whose absorption may be varied between maximum and minimum limit absorption conditions and an intermediate absorption condition.

A further object of the invention is to provide a power transmission which is efficient and effective in operation and wherein the power absorption condition of the torque converter may be readily selected by the vehicle operator.

A further object of the invention is to provide a transmission having an input member and a pair of output members, a torque converter for transmitting torque to one of said output members and a control mechanism for varying the aborption capacity of the torque converter so that torque may be diverted to one or the other of the output members, as desired.

A more particular object of the invention is to provide a power transmission having a torque converter including an impeller having a plurality of blades each rotatable on its own axis, and means responsive to actuation of the operator for rotating the impeller blades to vary the torque absorption of the torque converter.

These and other objects will be apparent as the description proceeds with reference to the accompanying drawings, in which:

FIGURE 4 is a view similar to FIGURE 3 but showing the elements of the control system in the position they assume for high torque absorption in the converter;

FIGURE 4a is a view similar to FIGURE 3a but showing the impeller blades in the position they assume for high torque absorption;

FIGURE 5 is a view similar to FIGURE 4 but illustrating the control system elements in the position they assume in normal operation; and FIGURE 5a is a view similar to FIGURES 3a and 4a showing the impeller blades in the position they assume in normal operation.

Figure 1:
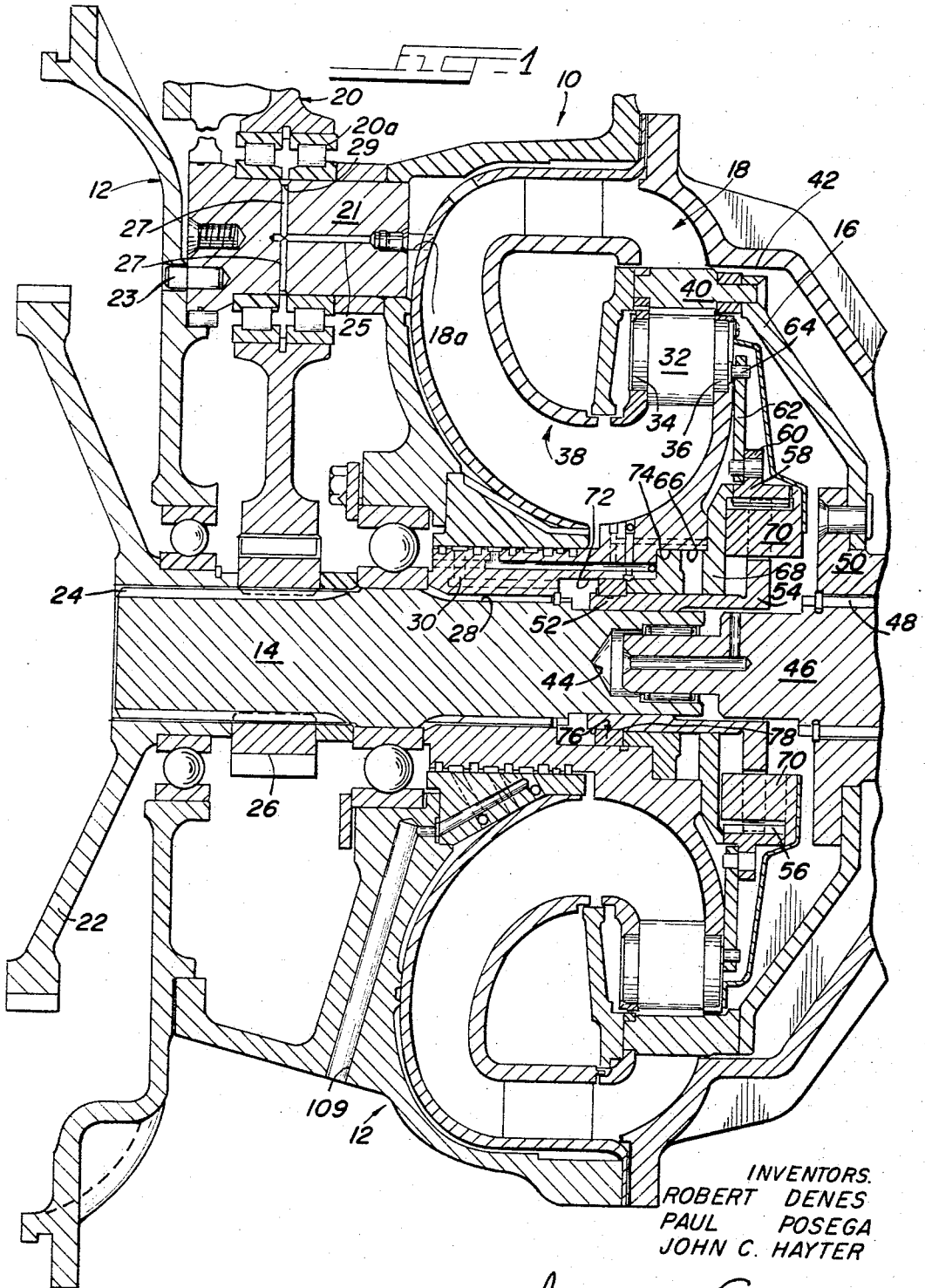
FIGURE 1 is a vertical elevational view of a power transmission made in accordance with the present invention.
Figure 2:
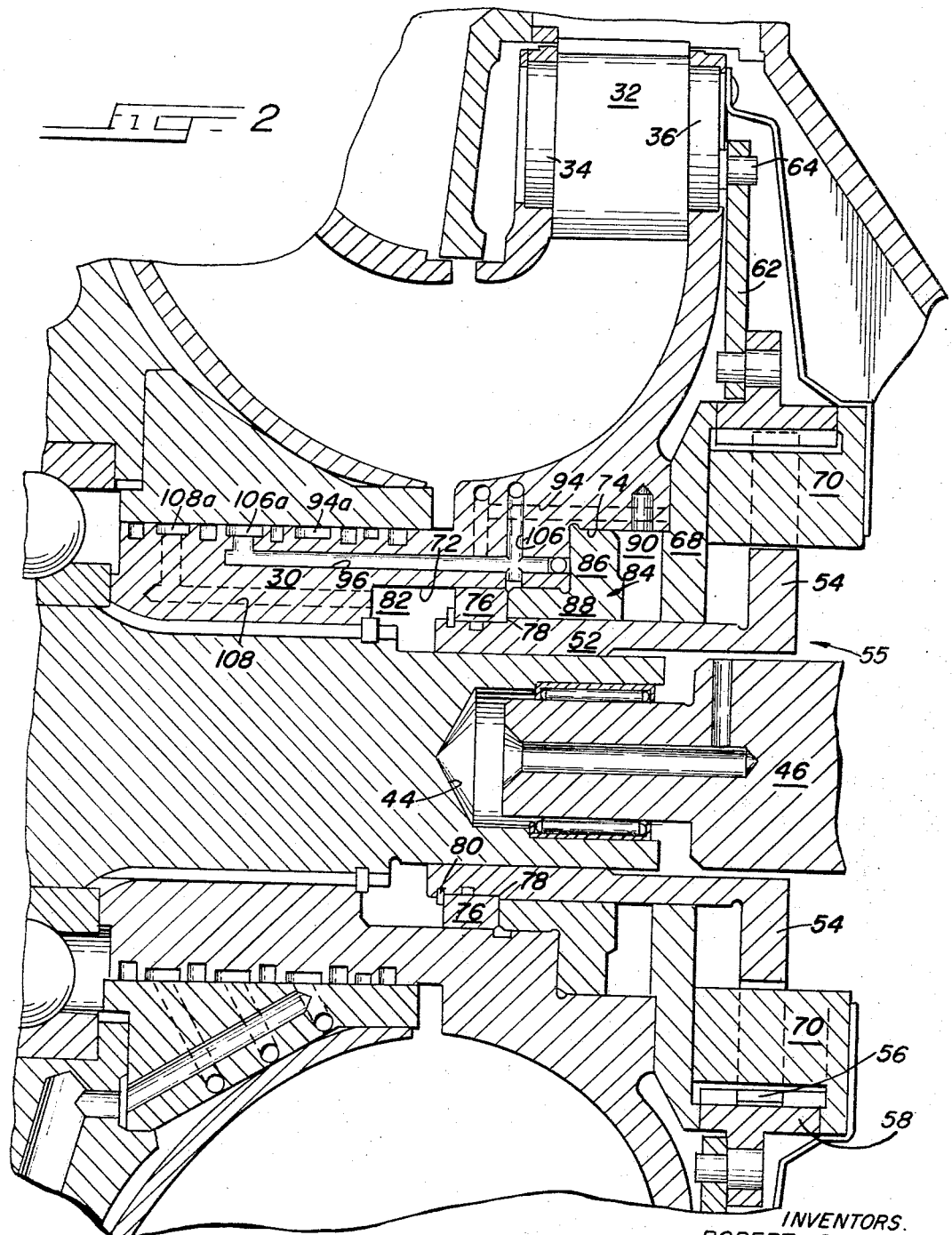
FIGURE 2 is an enlarged fragmentary vertical sectional view of a portion of the transmission illustrated in FIGURE 1.

Referring to the drawings and more particularly to FIGURES 1 and 2, the power transmission of the present invention is indicated generally by reference numeral 10 and includes a housing 12, an input member 14, an output member 16, a torque converter 18 and a power takeoff idler gear 20. Power from a suitable prime mover, such as an internal combustion engine, is supplied by a drive wheel 22 to the input shaft 14 by means of splines 24. Also splined to the input member 14 is a spur gear 26 in mesh with the idler gear 20 of the power takeoff.

It will be understood that the idler gear 20 is in mesh with another spur gear which is keyed to a power takeoff shaft. The shaft 14 is also formed with splines 28 on which is meshingly received an impeller hub 30 to which is secured a plurality of circumferentially spaced impeller blades 32. Each of the blades 32 has end bosses 34 and 36 journalled in the impeller hub so that each blade may rotate about its own axis. The torque converter 18 further includes a stator 38 and a turbine 40 connected at 42 to the output member 16.

In normal operation the toroidal chamber of the torque converter 18 is filled with fluid which is circulated in a toroidal path through the blades of the impeller against the blades of the turbine 40 to drive the output member 16 at varying torque level and thence against the blades of the stator.

According to the present invention the blades 32 are adjustable to vary the torque absorption of the torque converter 18 so that most of the power is transmitted either to the output member 16 for propulsion or to the output member 20 for auxiliary uses or to afford a divided distribution of torque between the output member 16 and the power takeoff.

Figure 3:
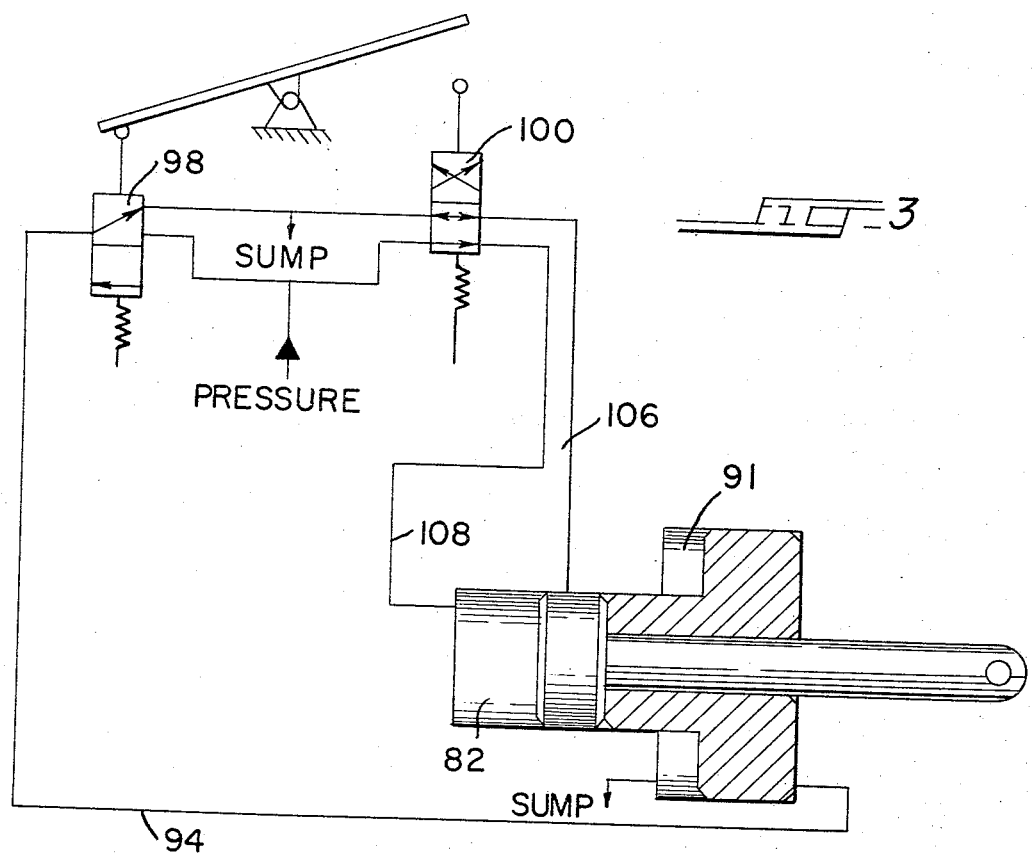
FIGURE 3 is a diagrammatic illustration of a control system for the transmission of FIGURES 1 and 2, with the elements in the position they assume for low torque absorption.
Figure 3A:
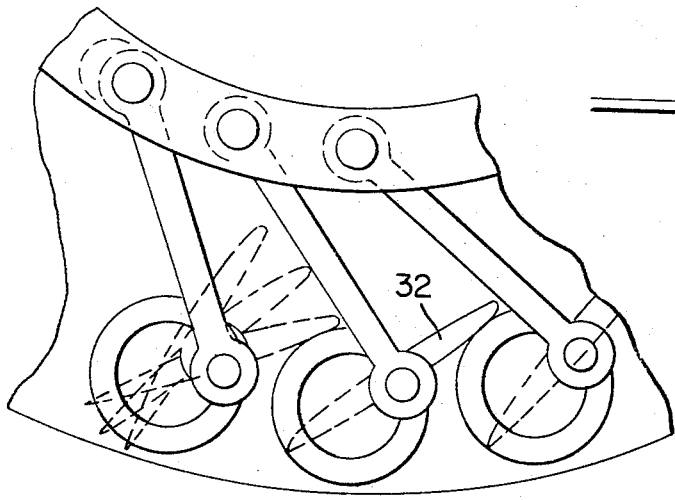
FIGURE 3a is a fragmentary view illustrating the impeller blade control subassembly of the transmission of FIGURES 1 and 2 with the impeller blades in position they assume for low torque absorption.

The variable absorption characteristics of the torque converter 18 are effected by varying the exit angle of the blades 32 from a normal 120°, as illustrated in FIGURE 5a, to approximately 140° for low converter torque absorption, as illustrated in FIGURE 3a, to approximately 100° for high converter torque absorption, as illustrated in FIGURE 4a. The blade angle for the pump element is measured between the mean camber line at the exit and the tangent passing through the exit.

The right end of the input shaft 14 has a central opening 44 for journalled reception of the left end of output shaft 46 which is splined at 48 to a hub 50 forming a part of the output member 16. The right end of the input shaft 14 is a reduced diameter and has slidably mounted thereon, a hollow plunger 52, which has at the right end thereof, as viewed in FIGURES 1 and 2, a plurality of radially outwardly extending sectors 54 each of which has at the outer periphery thereof helical splines 56 for meshing engagement with internal helical splines of a shift ring 58. Each of the sectors 54 form a part of a control subassembly 55. Extending outwardly from the shift ring 58 is a flange 60 to which is pivotally secured a plurality of links 62, each of which is pivotally connected to an eccentric pin 64 on each of the impeller blade bosses 36. Support blocks 70 limit movement of the plunger 52 and sectors 54 to an axial direction so that the interaction of the helical splines 56 and the shift ring 58 will produce a rotation of the shift ring 58. This, in turn, effects rotation of the blade 32, each about its own axis.

Rotation of the blades is effected by a hydraulic circuit which may be selectively actuated by the vehicle operator. The plunger 52 forms a part of a hydraulic cylinder 66 which is defined in part by the impeller hub 30 and in part by the right end of the input shaft 14. The right end of the cylinder 66 is closed by a ring 68 which provides lateral support for the shift ring 58 in cooperation with support blocks 70. The left end of the cylinder 66 is formed by a bore 72 while the right end of the bore 66 is formed by a counterbore 74 of larger diameter. A bearing ring 76 rides on the outer periphery of the left end of the plunger 52 and is retained in position by a shoulder 78 and a retainer ring 80. A chamber 82 is thus defined between the impeller hub 30, the shaft 14, the plunger 52 and the ring 76. Slidably mounted on the periphery of the plunger 52 is a sleeve 84 having a body portion 86 slidingly fitted into the bore 74 and a central axial boss 88 slidingly received in the bore 72. The portion 86 of the sleeve 84 defines, in cooperation with the ring 68, and the bore 74, a chamber 90 and forms in cooperation with the confronting edge of the impeller hub 30, a chamber 91, see FIGURE 3. In the condition of operation illustrated in FIGURE 4, it is apparent that the bore 72 also defines a chamber 92.

The operation of the control system of the present invention will now be described in detail with particular reference to FIGURE 5 which illustrates the condition of the system in normal operation. In this condition the helical sectors 54 are approximately midway between their travel limits and are maintained in that position by means of the control system in the following manner. Fluid under pressure is supplied from the pressure source, such as a pump or the like, by means of a conduit 94 to the chamber 90 to bias the sleeve 84 to the left to the position illustrated in FIGURE 5. Fluid within the chamber 90 at the left side of the body portion 86 is exhausted to sump by means of a passage 96. This is possible when the plunger of pilot valve 98 is in the normal position illustrated in FIGURE 5. There is also provided a pilot valve 100, which, in the normal position illustrated in FIGURE 5, permits the flow of fluid under pressure by means of a conduit 102 to the chamber 82. In this position of the sectors 54, the blades 32 are in the normal position, i.e., of an exit angle of approximately 120°. When the operator desires less torque in the power takeoff and greater torque in the output shaft 46, he pushes down with his heel on a pedal 104 so that it assumes the position illustrated in FIGURE 4. The pilot valve 98 is unaffected but the pilot valve 100 is moved to an alternate position in which fluid under pressure is transmitted by means of a conduit 106 to the chamber 92 so that the plunger 52 and the ring 76, are forced to the left, the fluid in the chamber 82 being exhausted to sump by means of a conduit 108. Since the pilot valve 98 does not move, a pressure condition still exists in the chamber 90 and the sleeve 84 remains fixed. When the plunger 52 is in the position illustrated in FIGURE 4 the blades 32 assume the position illustrated in FIGURE 4a, i.e., an exit angle of approximately 100°.

In the event that most of the power is needed for the power takeoff, the operator pushes down with his toes on pedal 104 so that the pedal assumes the position illustrated in FIGURE 3 and the exit angle of the impeller blade 32 is changed to approximately 140°, as illustrated in FIGURE 3a. In this condition, the pilot valve 100 is in its normal position, while the pilot valve 98 assumes a position in which the conduit 94 provides communication between the chamber 90 and sump. Fluid under pressure is supplied to the chamber 82 by means of the conduit 108, the chamber 92 has been exhausted to sump by means of conduit 106 and fluid is drawn into chamber 91 from sump.

Fluid under pressure is supplied to the conduits 94, 106, and 108, from grooves 94a, 106a, and 108a, respectively, formed in the periphery of the impeller hub 30, see FIGURE 2. These grooves are supplied by a plurality of pressure inlets 109.

According to the present invention the idler gear 20 is journalled by bearings 20a on a fixed stub shaft 21 secured to the housing 12 by means of a pin 23. Lubrication is supplied to the bearings 20a from the interior of the torque converter 18 by means of a conduit 18a and an axial bore 25 which communicates with a plurality of radial bores 27 or by means of a flat on the upper surface of the stub shaft 21.

The transmission of the present invention exhibits important advantages over transmission heretofore known. For example, the full power of the prime mover may be utilized for either the driveline or the power takeoff as required. For normal operations, the power may be substantially evenly divided by setting the control system of the invention in the medium or normal position.

Applicants do not intend to be limited by the above disclosure which is illustrative in nature, but intend to be limited only by the scope of the appended claims.

We claim:
1. A power transmission comprising an input member, a first output member, a torque converter drivingly connecting said input member and said output member, said torque converter having an impeller, a stator and a turbine, said impeller having a plurality of blades each mounted for rotation, a second output member drivingly connected to said input member, means for rotating the blades of said impeller effectively to divide the torque transmitted to said driven members so that the torque transmitted to said first driven member varies from a normal condition in which torque is divided substantially equally between said output members to another condition in which the majority of torque is diverted to said first output member and still another condition in which the majority of torque is diverted to said second output member.

2. A power transmission comprising an input member, a first output member, a torque converter drivingly connecting said input member and said output member, said torque converter comprising an impeller having a plurality of rotatably mounted blades, a stator and a turbine, a second output member drivingly connected to said input member, means for rotating the vanes of said impeller to divide power between said output members in a plurality of ratios.

3. A power transmission in accordance with claim 2, wherein said last-named means includes a control assembly operative in one position to divide the torque between said output members substantially equally, in another position to divide the torque so that most of the torque is diverted to said first output member, and still another position in which most of the torque is diverted to said second output member.

4. A power transmission comprising an input member, a first output member, a torque converter drivingly connecting said input member and said output member, said torque converter comprising an impeller having a plurality of rotatably mounted blades, a stator and a turbine, a second output member drivingly connected to said input member, a control assembly for rotating the blades of said impeller to divide power between said output members in a plurality of ratios, said control assembly including a hydraulic cylinder having a plunger, a source of fluid under pressure, a shift ring, helical spline actuatable by said plunger to rotate said shift ring, a plurality of links each pivotally connecting said shift ring with one of said impeller blades, said shift ring having internal helical splines in mesh with the helical splines of said plunger so that the impeller vanes are rotated about their axes of rotation in response to axial movement of said plunger.

5. A power transmission in accordance with claim 4, wherein said plunger is movable to one position in which torque is divided substantially equally between said first and second output members, to another position in which the majority of torque is transmitted to said first output member, and still another position in which the majority of torque is transmitted to said second output member.

6. A power transmission in accordance with claim 5, wherein said control assembly includes a source of pressure fluid, a hydraulic cylinder having a slidable plunger dividing said cylinder into at least two chambers one at each side of said plunger and actuatable to rotate the impeller blades to a plurality of distinct positions, a first pilot valve, a second pilot valve, said first pilot valve and said second pilot valve having a normal position in which communication is afforded between the source of fluid under pressure and both of said chambers so that said plunger assumes a position in which said blades are positioned for substantially equal torque transmission to said first and second output members, said first pilot valve being selectively actuatable to a second position in which communication is afforded between said source of fluid and one of said chambers while the other of said chambers is exhausted so that the impeller blades are rotated to a position for maximum torque transmission to said first output member, said second pilot valve being movable to a second position to effect exhaustion of said one chamber and pressurization of said other chamber and rotation of said vanes to a position affording maximum torque transmission to said second output member.

7. In a hydrodynamic power transmission having an input member, a torque converter having an impeller provided with a plurality of blades each rotatable about its own axis, a first output member drivingly connected to said input member through said torque converter and a second output member directly drivingly connected to said input member, the improvement comprising means for selectively controlling the torque absorption of said torque converter to vary the torque distribution between said first and second output members, said means including a shift ring, a plurality of links each pivotally connected to said shift ring and to each of said blades, means for rotating said shift ring for simultaneous rotation of the impeller blades about their own axes to vary the torque absorption of said torque converter between maximum and minimum conditions and to an intermediate condition, said last-named means including a hydraulic cylinder having a slidable plunger movable axially in response to manual actuation to effect rotation of the impeller vanes.

8. In a hydrodynamic power transmission having an input member, a torque converter having an impeller provided with a plurality of blades each rotatable about its own axis, a first output member drivingly connected to said input member through said torque converter and a second output member directly drivingly connected to said input member, the improvement comprising means for selectively controlling the torque absorption of said torque converter to vary the torque distribution between said first and second output members, said means including a shift ring, a plurality of links each pivotally connected to said shift ring and to each of said vanes, means for rotating said shift ring for simultaneous rotation of the impeller blades about their own axes to vary the torque absorption of said torque converter between maximum and minimum conditions and to an intermediate condition, said control means including a hydraulic circuit having a source of fluid under pressure, a first pilot valve, a second pilot valve, a hydraulic cylinder having a plunger axially slidable to effect rotation of said shift ring, said pilot valves each having a plunger biased to a normal position in which the fluid pressure on each side of said plunger is equal and in which said blades assume a position for substantially equal distribution of torque between said first output member and said second output member, said first pilot valve being selectively movable by said pedal to a second position in which fluid communication is afforded to said hydraulic cylinder at one side of said plunger for movement of said plunger in one direction and rotation of said blades to a position for maximum torque transmission to said first output member, said second pilot valve being movable from said normal position to an alternate position to afford fluid communication between said source and the other side of said plunger so that said blades are rotated to a position for transmission of maximum torque to said second output member.

9. A power transmission comprising an input member, a first output member, a torque converter drivingly connecting said input member and said output member, said torque converter comprising an impeller having a plurality of rotatably mounted blades, a stator and a turbine, a second output member drivingly connected to said input member, a control assembly for rotating the blades of said impeller to divide power between said output members in a plurality of ratios, said control assembly including a hydraulic cylinder having a portion of greater diameter, a sleeve slidably received in said cylinder, said sleeve having a body portion slidably received in the portion of said cylinder of greater diameter and having a central axial boss slidably received in said cylinder, said sleeve having a central opening, an axially movable plunger slidably received in said central opening, means including a helical spline for effecting rotation of said blades in response to axial movement of said plunger, a pedal selectively actuatable to three distinct positions, a first pilot valve, a source of fluid under pressure, said first pilot valve being actuatable by said pedal from a first position in which the impeller blades are in normal position to a second position in which fluid communication is afforded between said fluid pressure source and one side of said plunger to effect movement of said plunger in one direction to afford maximum torque absorption by said converter, a second pilot valve manually actuatable by said pedal from a normal position in which the fluid pressure on each side of said plunger is balanced to a second position in which fluid pressure on the other side of said plunger is increased and said blades are rotated to a position for a minimum torque absorption by said converter.

10. A transmission system, comprising: a hydrokinetic device having a toroidal chamber defined about a first axis and having at least one element with fluid directing blades each individually pivotal about an axis for said blade; hydraulic actuating means disposed closely about said first axis and having at least one portion movable for being hydraulically biased to discrete longitudinal steps along said first axis; linkage interconnecting said actuating means portion with said blades for translating each longitudinal step of said portion into a predetermined pivotal position for said blades; and manual means for regulating the hydraulic bias of said actuating means to promote selective positioning of said blades, said hydraulic actuating means being substantially nested within the toroidal core space of said toroidal chamber, and said linkage means particularly comprises a unitary ring drivingly connected to said actuating means portion and carrying a plurality of cranks each having one end connected to a portion of said blade off-set from the blade axis and another portion connected to one of a plurality of spaced circumferential positions on said ring.

References Cited

UNITED STATES PATENTS

| 2,893,266 | 7/1959 | Kelley | 60—54 X |
| 2,898,740 | 8/1959 | Kelley | 60—54 |
| 3,021,676 | 2/1962 | Tuck et al. | 60—54 |

EDGAR W. GEOGHEGAN, *Primary Examiner.*